United States Patent
Han et al.

(10) Patent No.: US 10,761,722 B2
(45) Date of Patent: Sep. 1, 2020

(54) BLACK SCREEN GESTURE DETECTION METHOD AND DEVICE, STORAGE MEDIUM, AND MOBILE TERMINAL

(71) Applicant: GUANGDONG OPPO MOBILE TELECOMMUNICATIONS CORP., LTD., Dongguan, Guangdong (CN)

(72) Inventors: Tong Han, Dongguan (CN); Mingqiang Guo, Dongguan (CN); Rendong Shi, Dongguan (CN); Hao Wang, Dongguan (CN); Qiang Zhang, Dongguan (CN)

(73) Assignee: GUANGDONG OPPO MOBILE TELECOMMUNICATIONS CORP. LTD., Guangdong (CN)

( * ) Notice: Subject to any disclaimer, the term of this patent is extended or adjusted under 35 U.S.C. 154(b) by 0 days.

(21) Appl. No.: 16/633,137

(22) PCT Filed: Jul. 6, 2018

(86) PCT No.: PCT/CN2018/094915
§ 371 (c)(1),
(2) Date: Jan. 22, 2020

(87) PCT Pub. No.: WO2019/019900
PCT Pub. Date: Jan. 31, 2019

(65) Prior Publication Data
US 2020/0201536 A1     Jun. 25, 2020

(30) Foreign Application Priority Data

Jul. 28, 2017 (CN) .......................... 2017 1 0632223

(51) Int. Cl.
*G06F 3/0488* (2013.01)
*G06F 11/34* (2006.01)
*G06F 3/0486* (2013.01)

(52) U.S. Cl.
CPC ........ *G06F 3/04883* (2013.01); *G06F 3/0486* (2013.01); *G06F 11/3438* (2013.01); *G06F 2203/04803* (2013.01)

(58) Field of Classification Search
CPC .................................................... G06F 3/04883
(Continued)

(56) References Cited

U.S. PATENT DOCUMENTS

| | | | | | |
|---|---|---|---|---|---|
| 8,487,896 | B1 * | 7/2013 | Brown | .................. | G06F 3/0418 345/173 |
| 9,158,372 | B2 * | 10/2015 | Lombardi | ............ | G09G 3/3208 |

(Continued)

FOREIGN PATENT DOCUMENTS

| CN | 104598155 A | 5/2015 |
|---|---|---|
| CN | 104965657 A | 10/2015 |

(Continued)

OTHER PUBLICATIONS

International Search Report in the international application No. PCT/CN20108/094915, dated Sep. 28, 2018.

(Continued)

*Primary Examiner* — Daniel Rodriguez

(57) ABSTRACT

A black screen gesture detection method and device, a storage medium and a mobile terminal. The method comprises: when a touch operation of a user in a preset first sub-region of a touchscreen in a screen-off state is detected, determining a sliding track of a touch point corresponding to the touch operation in the first sub-region of the touchscreen; if the touch point reaches a boundary of the first sub-region of the touchscreen, predicting a sliding trend of the touch point according to the sliding track and a preset gesture template; and determining, according to the sliding trend, a second sub-region of the touchscreen that the touch point is about to reach, and controlling the second sub-region of the (Continued)

touchscreen to be in an active state, so as to detect a touch operation acting on the second subregion of the touchscreen.

20 Claims, 6 Drawing Sheets

(58) Field of Classification Search
USPC .......................................................... 715/863
See application file for complete search history.

(56) References Cited

U.S. PATENT DOCUMENTS

| | | | |
|---|---|---|---|
| 9,933,936 B2* | 4/2018 | Lee ..................... | G06F 3/0414 |
| 10,379,599 B2* | 8/2019 | Vasistha ................ | G06F 1/3265 |
| 10,425,665 B2* | 9/2019 | Oman ................. | H04N 21/2183 |
| 2008/0111710 A1* | 5/2008 | Boillot ................... | G06F 3/017 |
| | | | 341/22 |
| 2010/0289754 A1* | 11/2010 | Sleeman ................. | G06F 3/044 |
| | | | 345/173 |
| 2011/0157028 A1* | 6/2011 | Stallings ............. | G06F 3/04883 |
| | | | 345/173 |
| 2011/0316797 A1* | 12/2011 | Johansson ........... | G06F 3/04883 |
| | | | 345/173 |
| 2012/0212435 A1 | 8/2012 | Bae | |
| 2013/0342525 A1* | 12/2013 | Benko ..................... | G06T 15/08 |
| | | | 345/419 |
| 2015/0006172 A1* | 1/2015 | Alameh .................. | G10L 15/26 |
| | | | 704/235 |
| 2015/0293637 A1* | 10/2015 | Wadman ............ | G06K 9/00335 |
| | | | 345/173 |
| 2016/0224235 A1* | 8/2016 | Forsstrom ............. | G06F 3/0488 |
| 2016/0370988 A1 | 12/2016 | Bae | |
| 2016/0378334 A1* | 12/2016 | Liu ....................... | G06F 1/1643 |
| | | | 715/794 |
| 2017/0322623 A1* | 11/2017 | McKenzie ............ | G06F 3/0346 |

FOREIGN PATENT DOCUMENTS

| | | |
|---|---|---|
| CN | 104991789 A | 10/2015 |
| CN | 106569717 A | 4/2017 |
| CN | 106919243 A | 7/2017 |
| CN | 107463329 A | 12/2017 |

OTHER PUBLICATIONS

First Office Action of the Chinese application No. 201710632223.3, dated May 6, 2019.
Notice of Allowance of the Chinese application No. 201710632223.3, dated Jul. 18, 2019.

* cited by examiner

BLACK SCREEN GESTURE DETECTION METHOD AND DEVICE, STORAGE MEDIUM, AND MOBILE TERMINAL

TECHNICAL FIELD

The disclosure relates to technologies of a mobile terminal, and more particularly to a method and device for detecting a screen-off gesture, a storage medium, and a mobile terminal.

BACKGROUND

A mobile terminal such as a smart phone, a palm computer, a tablet computer or a handheld game console, is usually designed with a touch screen to enable touch inputting, which facilitates an operation of a user.

A screen-off gesture function of a smart phone is distinguishing, which can provide a sense of future science and technology. When the screen-off gesture function is switched on, a screen gesture operation may be detected even in a standby screen-off state of the smart phone, to trigger a corresponding function or software in the phone.

SUMMARY

The disclosure provides a method and device for detecting a screen-off gesture, a storage medium, and a mobile terminal, which may effectively reduce power consumption of the mobile terminal, thereby improving endurance.

The disclosure provides a method for detecting a screen-off gesture, which includes the following operations.

Responsive to detecting a touch operation of a user in a first preset touch screen sub-region in a screen-off state, a sliding trail of touch points corresponding to the touch operation in the first touch screen sub-region is determined, where the first touch screen sub-region is in an active state in which the touch operation is detectable.

In a case that a touch point among the touch points reaches a boundary of the first touch screen sub-region, a sliding trend of the touch points is predicted according to the sliding trail and a preset gesture template.

A second touch screen sub-region that the touch point is about to reach is determined according to the sliding trend, and the second touch screen sub-region is controlled to be in the active state to detect a touch operation acting on the second touch screen sub-region.

The disclosure also provides a device for detecting a screen-off gesture, which may include a trail determination module, a trend prediction module and a sub-region activation module.

The trail determination module may be configured to, responsive to detecting a touch operation of a user in a first preset touch screen sub-region in a screen-off state, determine a sliding trail of touch points corresponding to the touch operation in the first touch screen sub-region, where the first touch screen sub-region is in an active state in which the touch operation is detectable.

The trend prediction module may be configured to, in a case that a touch point among the touch points reaches a boundary of the first touch screen sub-region, predict a sliding trend of the touch points according to the sliding trail and a preset gesture template.

The sub-region activation module may be configured to determine a second touch screen sub-region that the touch point is about to reach according to the sliding trail and control the second touch screen sub-region to be in the active state to detect a touch operation acting on the second touch screen sub-region.

The disclosure also provides a computer-readable storage medium having stored therein a computer program that, when executed by a processor, causes the processor to implement the method for detecting a screen-off gesture of embodiments of the disclosure.

The disclosure also provides a mobile terminal, which may include a touch screen, a memory and a processor.

The touch screen may include at least two preset touch screen sub-regions, and part of the touch screen sub-regions is controlled by the processor to be in an active state to detect a touch operation or display a gesture trail of the touch operation.

The memory may be configured to store an association relationship between a touch operation and an application and store a computer program capable of running in the processor.

The processor may be configured to execute the computer program to implement the method for detecting a screen-off gesture of the embodiments of the disclosure.

DETAILED DESCRIPTION

Figure 1:
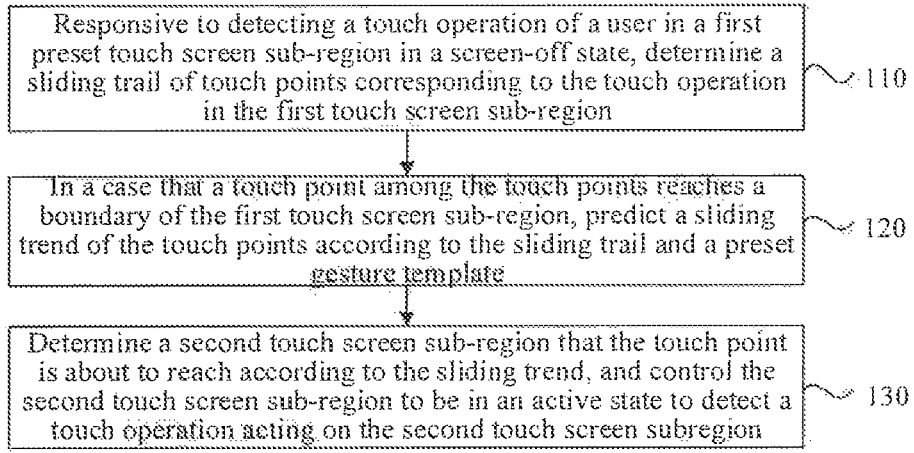
FIG. 1 is a flowchart of a method for detecting a screen-off gesture according to an embodiment.

Some implementations are described as processing or methods described as flowcharts. Although multiple operations in the flowcharts are described as sequential processing, many operations therein may be implemented in parallel, concurrently or simultaneously. In addition, a sequence of each operation may be rearranged. The processing may be terminated when operations thereof are completed, but there may also be additional operations not included in the drawings. The processing may correspond to a method, a function, a procedure, a subroutine, a subprogram and the like.

A screen-off gesture function refers to the following function. In case that a mobile terminal (for example, a smart phone) is in a screen-off dormant state, a touch screen runs in a low-power-consumption state to detect a touch operation acting on the touch screen in a screen-off state, determine a screen-off gesture corresponding to the touch operation, and wake up a function of the smart phone or switch on a preset application corresponding to a type of the screen-off gesture according to the screen-off gesture. In the following, for conveniently understanding the screen-off gesture function, a flow from detection of a screen-off gesture in a screen-off state to enabling of an application corresponding to the screen-off gesture in an application layer will be described below. The flow includes the following operations. Gesture data corresponding to the screen-off gesture is stored in a preset node of a driver layer, where the gesture data includes gesture coordinates and a gesture type. The driver layer judges whether the date of the screen-off gesture is valid. When the data of the screen-off gesture is judged to be valid, a framework layer dispatches a screen-off gesture event. The application layer reads, from the preset node in the driver layer, gesture coordinates upon reception of the screen-off gesture event. The application layer calculates a motion trail of the screen-off gesture according to the gesture coordinates and the gesture type, and sends data of the motion trail to a Frame Buffer, and displays the motion trail on the touch screen with a set screen refresh rate. Then, the application layer enables the application corresponding to the screen-off gesture.

In the related art, a touch chip outputs a touch sensing control signal with a scanning frequency that is lower than a scanning frequency in a normal screen-on state to a touch screen, and then a low current flows through a surface of the touch screen, so that the whole touch screen is in a low-power-consumption state for detecting a screen-off gesture. However, when a user uses a screen-off gesture function, a screen-off gesture is usually input into a part of an area of the touch screen, and no screen-off gesture may be detected in the remaining part of the area of the touch screen. In the related art, a terminal may not regulate a power consumption condition of the touch screen according to a touch operation of the user, which results in poor endurance of the terminal. A shortcoming of a related screen-off gesture processing flow results in relatively high power consumption of the mobile terminal and reduces the endurance of the mobile terminal. Through a screen-off gesture detection solution provided in the embodiments, the problem of relatively poor endurance of a terminal may be solved relatively well.

FIG. 1 is a flowchart of a method for detecting a screen-off gesture according to an embodiment. The method may be executed by a device for detecting a screen-off gesture. The device may be implemented by at least one of software or hardware and may usually be integrated in a mobile terminal. As illustrated in FIG. 1, the method includes the following operations.

At block 110, responsive to detecting a touch operation of a user in a first preset touch screen sub-region in a screen-off state, a sliding trail of touch points corresponding to the touch operation in the first touch screen sub-region is determined.

The first touch screen sub-region is in an active state in which the touch operation may be detected.

A touch screen is divided into at least two sub-regions in advance, a sequence number of a signal line corresponding to each sub-region is recorded, and each sub-region is recorded as a touch screen sub-region. The touch screen sub-regions are determined in multiple manners. For example, a touch screen division feature may be added into a screen-off gesture function, the touch screen may be equally divided into the at least two sub-regions as a default based on the function, and after the screen-off gesture function is switched-on, a touch sensing control signal is only provided for a preset sub-region to make the sub-region in the active state. For another example, a touch screen division option is provided for the user such that the user divides the touch screen into the at least two sub-regions according to an own using habit and specifies a sub-region to be in the active state.

Figure 2:
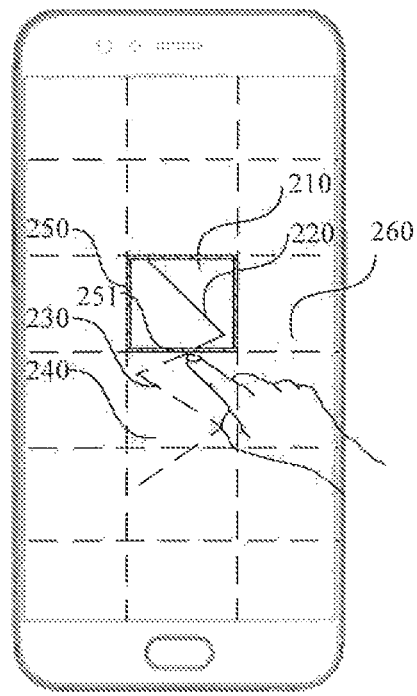
FIG. 2 is a schematic diagram of a touch screen sub-region according to an embodiment.

FIG. 2 is a schematic diagram of a touch screen sub-region. The dotted line and gesture trail in FIG. 2 are drawn in the figure for graphic description and are not displayed on the touch screen. As illustrated in FIG. 2, responsive to detecting the touch operation in the first touch screen sub-region 210, the sliding trail 220 of touch points corresponding to the touch operation in the first touch screen sub-region 210 may be determined according to positions of the touch points corresponding to the touch operation.

A touch chip may be controlled by a processor to provide a touch sensing control signal for the first touch screen sub-region to enable the first touch screen sub-region to detect the touch operation.

For example, for a capacitive touch screen, when the user inputs a screen-off gesture, the user and a surface of the touch screen form a coupling capacitor due to a human body electric field. For a high-frequency current, a capacitor is a direct conductor. Therefore, a finger takes a low current away from a touch point, and the touch chip accurately calculates a current change to obtain a position, recorded as a gesture coordinate, of the touch point.

The touch screen is prepared in multiple manners. For example, a touch electrode may be fabricated on a glass substrate of a display panel to obtain the touch screen with a touch detection function.

Responsive to detecting the touch operation of the user in the first preset touch screen sub-region in the screen-off state, the mobile terminal is woken up, and a kernel layer calls an interruption processing of a driver layer. The driver layer reads, through the interruption processing function, gesture data corresponding to the touch operation detected by the touch chip. The gesture data includes the gesture coordinates. The driver layer performs curve fitting on the gesture coordinates in real time to obtain the sliding trail of the touch points of the user in the first touch screen sub-region. Curve fitting is a data processing manner and refers to approximately describing or simulating, by use of a continuous curve, a function relationship between coordinates represented by discrete points on a plane.

At block 120, when the touch point reaches a boundary of the first touch screen sub-region, a sliding trend of the touch points is predicted according to the sliding trail and a preset gesture template.

The boundary includes preset line segments forming the first touch screen sub-region and a region at a vertical distance that is a set numerical value far away from the line segment. As illustrated in FIG. 2, there are boundaries 250 around the first touch screen sub-region 210.

The acquired gesture coordinate of the touch point are matched with a coordinate range of the boundary. If the gesture coordinate falls into the coordinate range of the boundary, it is determined that the touch point reaches the boundary of the first touch screen sub-region. The driver layer takes the touch point as a division point and matches a gesture trail formed by gesture coordinates before the division point and a preset gesture template to determine the sliding trend of the touch point. For example, a starting point of the gesture trail formed by the gesture coordinates before the division point is overlapped with a starting point of a gesture trail in the preset gesture template, a difference between ordinates of preset sampling points with the same abscissa on the two gesture trails is determined, and the difference is determined as a deviation between the gesture trails. The number of times for which deviations of the gesture sub-trails exceed a preset deviation threshold is counted, and when the number of times is less than a preset threshold, it is determined that the gesture trail in the preset gesture template is a gesture trail closest to the sliding trail in the first touch screen sub-region. Therefore, the sliding trend of the touch points is obtained according to the gesture trail in the preset gesture template.

The sliding trail illustrated in FIG. 2 is taken as an example. Responsive to detecting the sliding trail 220 in the first touch screen sub-region 210, it may be predicted based on the sliding trail 220 and the preset gesture template that the sliding trail 220 may correspond to a screen-off gesture ">" and may also correspond to a screen-off gesture "≥". Accordingly, it is predicted that the touch point may slide to a first region 240.

At block 130, a second touch screen sub-region that the touch point is about to reach is determined according to the sliding trend, and the second touch screen sub-region is controlled to be in the active state to detect a touch operation acting on the second touch screen sub-region.

The second touch screen sub-region is collinear with the first touch screen sub-region.

In an embodiment, a boundary, among boundaries of the first touch screen sub-region, at a shortest distance far away from a last touch point of the sliding trail is determined as a target boundary, and a touch screen sub-region collinear with the target boundary is determined as the second touch screen sub-region. As illustrated in FIG. 2, a distance between the target boundary 251 and the last touch point of the sliding trail is minimum. The first region 240 collinear with the target boundary 251 is determined as the second touch screen sub-region.

The driver layer controls the touch chip to output the touch sensing control signal to the signal line corresponding to the second touch screen sub-region to activate the second touch screen sub-region, so that the touch operation may be detected in the second touch screen sub-region.

According to the method provided in the embodiment, the first preset touch screen sub-region is activated, and a screen-off gesture is detected through the touch screen sub-region; responsive to detecting the touch operation of the user in the first preset touch screen sub-region in the screen-off state, the sliding trail of touch points corresponding to the touch operation in the first touch screen sub-region is determined; when a touch point among the touch points reaches to a vicinity of the boundary of the first touch screen sub-region, the sliding trend of the touch points is predicted according to the sliding trail and the preset gesture template; and the second touch screen sub-region that the touch point is about to reach is determined according to the sliding trend, and the second touch screen sub-region is controlled to be in the active state. A driving signal is adaptively provided for the preset touch screen sub-region according to the operation of the user to avoid occurrence of the circumstance that, after the screen-off gesture function is switched-on, the touch sensing control signal is provided for the entire touch screen to cause relatively high power consumption of the mobile terminal. Through the method provided in the embodiment, power consumption of the mobile terminal may be effectively reduced, and endurance may be improved.

Figure 3A:
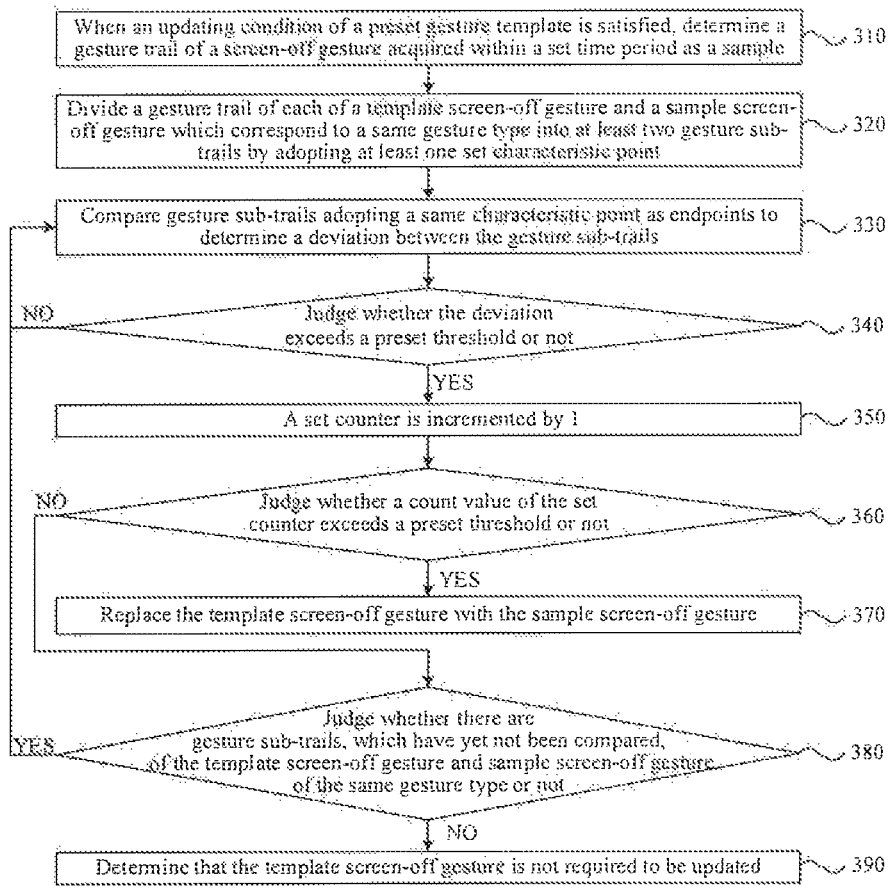
FIG. 3a is a flowchart of a method for updating a gesture template according to an embodiment.

FIG. 3*a* is a flowchart of a method for updating a gesture template according to an embodiment. As illustrated in FIG. 3*a*, the method includes the following operations.

At block 310, when an updating condition of a preset gesture template is satisfied, a gesture trail of a screen-off gesture acquired within a set time period is determined as a sample.

The updating condition is a prerequisite for triggering a mobile terminal to perform a gesture template updating operation. Multiple forms are adopted for the updating condition. For example, it may be a time. The mobile terminal provides an updating time setting option for a user, when the user uses a screen-off gesture function for the first time, an updating time may be set as the updating condition. Then, when a time for which the screen-off gesture function is used reaches the updating time, an updating indication is generated and an updating operation over the preset gesture template is triggered by the updating indication. If the user adjusts the updating time, the adjusted updating time is determined as the updating condition. The updating time may also be a system default time.

Responsive to detecting the updating indication, an ending moment of a previous updating operation over the preset gesture template is determined as starting time, and a gesture trajectory of a screen-off gesture in a time interval between the starting time and a present time upon detection of the updating indication is acquired. The gesture trails of the screen-off gestures in the time interval are determined as training samples.

In 320, a gesture trail of each of a template screen-off gesture and a sample screen-off gesture which correspond to the same gesture type is divided into at least two gesture sub-trails by adopting at least one set characteristic point.

The set characteristic point may be a turning point or a sampling point determined according to a preset sampling rule, etc.

Figure 3B:
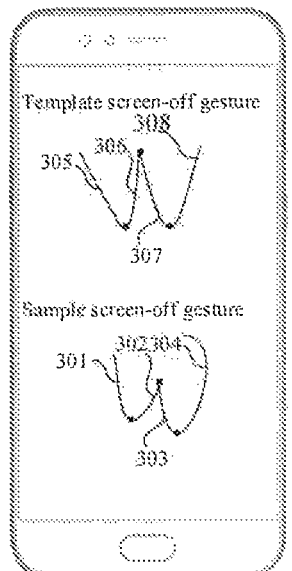
FIG. 3b is a schematic diagram of a gesture trail of a gesture template according to an embodiment.

Multiple characteristic points are preset, and the gesture trail of each of the template screen-off gesture and the sample screen-off gesture which correspond to the same gesture type is divided into the at least two gesture sub-trails by adopting the set characteristic points. FIG. 3*b* is a schematic diagram of a gesture trail of a gesture template. In FIG. 3*b*, a screen-off gesture trail is a trail obtained by the driver layer in a manner of recognizing a screen-off gesture input by the user in a screen-off state, and in such case, the screen-off gesture trail is not displayed in a touch screen. As illustrated in FIG. 3*b*, turning points are adopted as the characteristic points, and the gesture trial of each of a sample screen-off gesture and template screen-off gesture of a screen-off gesture "W" is divided into multiple sub-trails. For the gesture trail of the sample screen-off gesture, the gesture trail is divided into a first gesture sub-trail 301, a second gesture sub-trail 302, a third gesture sub-trail 303 and a fourth gesture sub-trail 304 by adopting three characteristic points at turning points. For the gesture trail of the template screen-off gesture, the gesture trail of the screen-off gesture "W" in the screen-off gesture template is divided into a first sub-trail 305, a second sub-trail 306, a third sub-trail 307 and a fourth sub-trail 308 by adopting the same characteristic points.

At block 330, gesture sub-trails adopting a same characteristic point as endpoints are compared to determine a deviation between the gesture sub-trails.

Starting points of the gesture sub-trails, adopting the same characteristic point as endpoints, of the sample screen-off gesture and the template screen-off gesture are overlapped, a difference between ordinates of preset sampling points with the same abscissa on the two gesture trails is determined, and the difference is determined as the deviation between the gesture sub-trails.

For example, starting points of the first gesture sub-trail 301 and the first sub-trail 305 are overlapped, and a difference between ordinates of preset sampling points with the same abscissa on the gesture sub-trails is determined as a first deviation. The sub-trails of each group of the other three groups of sub-trails are compared to determine a deviation between the sub-trails of the group.

At block 340, whether the deviation exceeds a preset threshold or not is judged, if YES, an operation illustrated in block 350 is executed, and if NO, an operation illustrated in block 330 is executed.

The preset threshold is a system default value, and if the deviation exceeds the preset threshold, it may be considered that the two sub-trails are dissimilar.

At block 350, a set counter is incremented by 1.

The counter is pre-configured to count the number of gesture sub-trails of which deviations exceed a preset deviation threshold in the gesture sub-trails of the sample screen-off gesture and template screen-off gesture of the same type. When the deviation between two gesture sub-trails of the sample screen-off gesture and template screen-off gesture of the same type exceeds the preset deviation threshold, the counter is controlled to add 1.

At block 360, whether a count value of the set counter exceeds a preset threshold or not is judged, if YES, an operation illustrated in block 370 is executed, and if NO, an operation illustrated in block 380 is executed.

The preset threshold is a system default value, and if the count value of the set counter exceeds the preset threshold, it may be considered that the gesture trails of the sample screen-off gesture and the template screen-off gesture are dissimilar.

At block 370, the template screen-off gesture is replaced with the sample screen-off gesture.

When the count value of the counter exceeds the preset threshold, the gesture trail of the sample screen-off gesture is stored in the preset gesture template instead of the gesture trail of the template screen-off gesture.

At block 380, whether there are gesture sub-trails, which have yet not been compared, of the template screen-off gesture and sample screen-off gesture of the same gesture type or not is judged, if YES, an operation illustrated in block 330 is executed, and if NO, an operation illustrated in block 390 is executed.

At block 390, it is determined that the template screen-off gesture is not required to be updated.

When the count value of the counter does not exceed the preset threshold and all the gesture sub-trails of the template screen-off gesture and sample screen-off gesture of the same gesture type have been compared, it is determined that the gesture trail of the template screen-off gesture is not required to be replaced with the gesture trail of the sample screen-off gesture.

According to the method provided in the embodiment, when the updating condition of the preset gesture template is satisfied, the gesture trail of the screen-off gesture acquired within the set time period is determined as the sample; the gesture trail of each of the template screen-off gesture and the sample screen-off gesture which correspond to the same gesture type is divided into the at least two gesture sub-trails by adopting at least one set characteristic point; the gesture sub-trails adopting the same characteristic point as the endpoints are compared to determine the deviation between the gesture sub-trails, and the number of times for which deviations of the gesture sub-trails exceed the preset deviation threshold is counted; and when the number of times exceeds the preset threshold, the template screen-off gesture is replaced with the sample screen-off gesture. Through the method, personalized adjustment of the preset gesture template may be implemented according to a writing habit of the user, and a screen-off gesture recognition rate is increased.

Figure 4A:
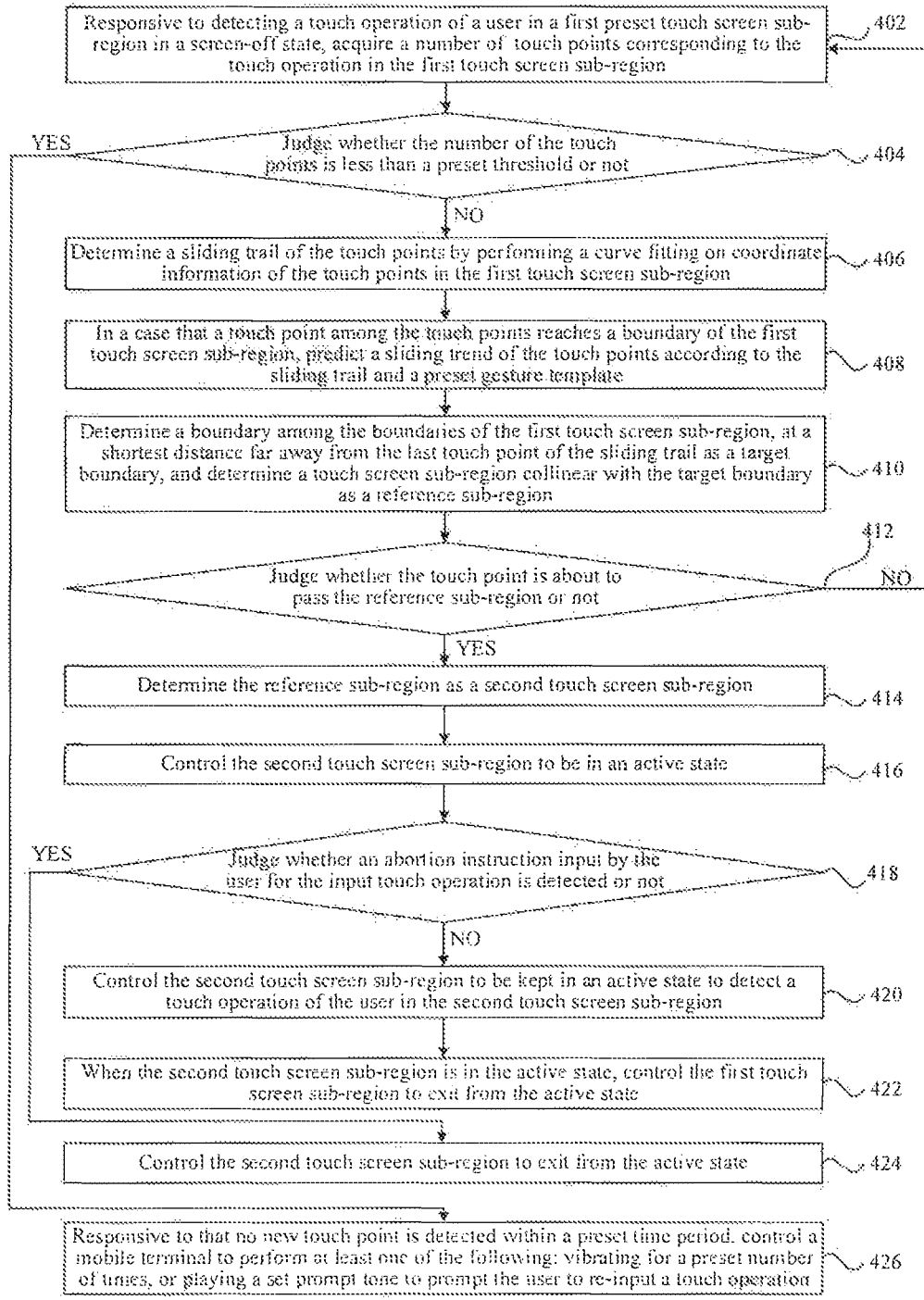
FIG. 4a is a flowchart of another method for detecting a screen-off gesture according to an embodiment.

FIG. 4a is a flowchart of another method for detecting a screen-off gesture according to an embodiment. As illustrated in FIG. 4a, the method includes the following operations.

At block 402, responsive to detecting a touch operation of a user in a first preset touch screen sub-region in a screen-off state, a number of touch points corresponding to the touch operation in the first touch screen sub-region is acquired.

A touch chip, responsive to detecting the touch operation input by the user in the first preset touch screen sub-region in the screen-off state, stores gesture data corresponding to the touch operation in a set register and sends an interruption wakeup signal to a kernel layer. The kernel layer, after receiving the interruption wakeup signal, executes a system wakeup operation. After a system is woken up, the kernel layer calls an interruption processing function of a driver layer for execution. The driver layer reads, through the interruption processing function, the gesture data corresponding to the touch operation in the first touch screen sub-region from the set register of the touch chip and determines the number of the touch points based on the gesture data.

At block 404, whether the number of the touch points is less than a preset threshold or not is judged, if YES, an operation illustrated in block 426 is executed, and if NO, an operation illustrated in block 406 is executed.

The preset threshold is set as a default by the system. If the number of the touch points in the first touch screen sub-region is less than the preset threshold, the driver layer considers that read touch points are not enough to draw a recognizable gesture sub-trail (namely a trail drawn according to the read touch points is matched with most of gesture trails in a gesture template and it is impossible to determine a motion trend of the touch points according to the gesture sub-trail), determines the read gesture data as undetermined data and continues waiting for input of the user.

At block 406, a sliding trail of the touch points is determined by performing a curve fitting on coordinate information of the touch points in the first touch screen sub-region.

When the number of the touch points in the first touch screen sub-region exceeds the preset threshold, the driver layer performs curve fitting on the coordinate information (gesture coordinates) of the read touch points to obtain a closest sliding trail.

At block 408, in a case that a touch point among the touch points reaches a boundary of the first touch screen sub-region, a sliding trend of the touch points is predicted according to the sliding trail and a preset gesture template.

Figure 4B:
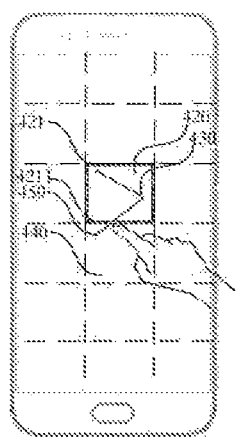
FIG. 4b is a schematic diagram of another touch screen sub-region according to an embodiment.
Figure 4C:
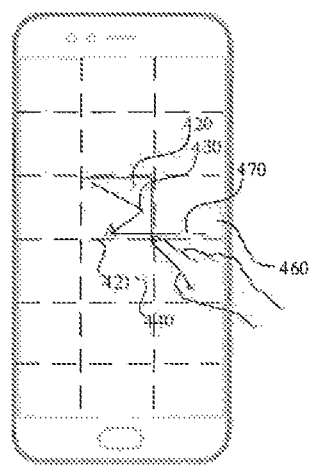
FIG. 4c is a schematic diagram of yet another touch screen sub-region according to an embodiment.

FIG. 4b is a schematic diagram of another touch screen sub-region. The sliding trail illustrated in FIG. 4b is taken as an example. Responsive to detecting the sliding trail 430 in the first touch screen sub-region 420, it may be predicted based on the sliding trail 430 and the preset gesture template that the sliding trail 430 may correspond to a screen-off gesture ">", and accordingly, it is predicted that the touch point may slide to a first region 440. FIG. 4c is a schematic diagram of another touch screen sub-region according to an embodiment. The sliding trail illustrated in FIG. 4c is taken as an example. Responsive to detecting the sliding trail 430 in the first touch screen sub-region 420, it may be predicted based on the sliding trail 430 and the preset gesture template that the sliding trail 430 may correspond to a screen-off gesture "Z", and accordingly, it is predicted that the touch point may slide to a second region 460.

At block 410, a boundary among the boundaries of the first touch screen sub-region, at a shortest distance far away from the last touch point of the sliding trail is determined as a target boundary, and a touch screen sub-region collinear with the target boundary is determined as a reference sub-region.

The number of the reference sub-regions is counted. In some scenario, the number of the reference sub-regions is one, and as illustrated in FIG. 4b, the distance between the target boundary 4211 and the last touch point of the sliding trail is minimum. The first region 440 collinear with the target boundary 4211 is determined as the reference sub-region.

Figure 4D:
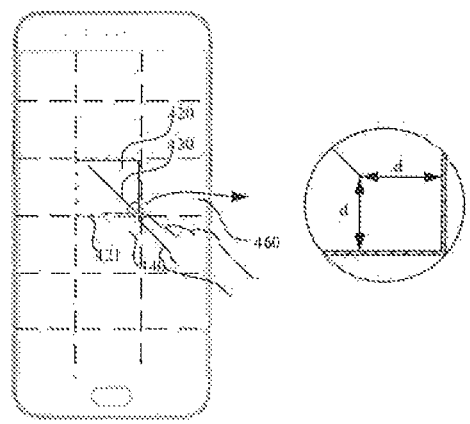
FIG. 4d is a schematic diagram of still another touch screen sub-region according to an embodiment.

In some scenarios, as illustrated in the schematic diagram of another touch screen sub-region illustrated in FIG. 4d, there may be two target boundaries among the boundaries of the first touch screen sub-region 420, at the minimum distance far away from the last touch point of the sliding trail 430. Therefore, there are also two reference sub-regions collinear with the target boundaries, i.e., the first sub-region 440 and the second sub-region 460.

At block 412, whether the touch point is about to pass the reference sub-region or not is judged according to the sliding trend, if YES, an operation illustrated in block 414 is executed, and if NO, an operation illustrated in block 402 is executed.

When there is one reference sub-region, whether the touch point is about to slide into the reference sub-region or not is judged according to the sliding trend of the touch points, if YES, an operation illustrated in block 414 is executed, and it NO, an operation illustrated in block 402 is re-executed to continue reading a touch point acting on the first touch screen sub-region. As illustrated in FIG. 4b, the first region 440 is determined as the reference sub-region, and it is predicted according to the sliding trail 430 and the preset gesture template that the screen-off gesture may be ">". Therefore, it may be predicted that the touch point may slide to the first region 440. Since it is determined that there is only one reference sub-region, it is determined that the touch point is about to pass the reference sub-region. As illustrated in FIG. 4c, the first region 440 is determined as the reference sub-region, and it is predicted according to the sliding trail 430 and the preset gesture template that the screen-off gesture may be "Z" (corresponding to the circumstance that the screen-off gesture ">" is not enabled). Therefore, it may be predicted that the touch point does not slide to the first region 440, and furthermore, it is determined that the touch point is not about to pass the reference region.

At block 414, the reference sub-region is determined as a second touch screen sub-region.

When there is only one reference sub-region, if the touch point is about to pass the reference sub-region, the reference sub-region is determined as the second touch screen sub-region.

When there are two reference sub-regions, a reference sub-region that the touch point is about to pass is selected from the two reference sub-regions according to the sliding trend and is determined as the second touch screen sub-region, and if no reference sub-region that the touch point is about to pass is selected according to the sliding trend, both the two reference sub-regions are determined as second touch screen sub-regions. As illustrated in FIG. 4d, the touch point is about to pass a vertex of the first touch screen sub-region 420, the specific one that the touch point is about to pass in the first sub-region 440 and the second sub-region 460 may not be selected, and then both the first sub-region 440 and the second sub-region 460 are determined as second touch screen sub-regions. At block 416, the second touch screen sub-region is controlled to be in an active state.

A touch sensing control signal is output to a signal line corresponding to the second touch screen sub-region to make the second touch screen sub-region in the active state.

In an embodiment, determination accuracy of the second touch screen sub-region may be improved in the following manner. If a screen-off gesture input process of the user is interrupted, at least one reference sub-region is determined according to the last touch point of the sliding trail, the touch sensing control signal may be continued to be provided for the first touch screen sub-region, whether there is a touch operation acting on the first touch screen sub-region within a set time period or not is detected, and if YES, provision of the touch sensing control signal for the second touch screen sub-region is stopped. Meanwhile, the touch sensing control signal is continued to be provided for the first touch screen sub-region to continue detecting the touch operation acting on the first touch screen sub-region. As illustrated in FIG. 4c, when the input of user is interrupted at a point A, the point A being the last touch point of the sliding trail. It may be determined based on the point A that the first region 440 is the reference sub-region, and it is predicted according to the sliding trail 430 and the preset gesture template that the screen-off gesture may be ">". The first region 440 is determined as the second touch screen sub-region. Meanwhile, touch sensing control signals are provided for the first touch screen sub-region 420 and the second touch screen sub-region. If the touch operation (namely the user continues inputting a screen-off gesture) in the first touch screen sub-region 420 is detected within a set time period, it is considered that the wrong second touch screen sub-region is determined, and output of the touch sensing control signal thereto is stopped. The second touch screen sub-region is redetermined according to the touch point in the first touch screen sub-region 420.

At block 418, whether an abortion instruction input by the user for the input touch operation is detected or not is judged, if YES, an operation illustrated in block 424 is executed, and if NO, an operation illustrated in block 420 is executed.

The abortion instruction is a pre-configured instruction triggered by a set operation of the user. The abortion instruction may be triggered by multiple set operations. For example, a system default gesture, for example, shaking the mobile terminal or brushing an upper end of the touch screen of the mobile terminal, may be adopted. A user-defined gesture and the like may also be adopted.

At block 420, the second touch screen sub-region is controlled to be kept in an active state to detect a touch operation of the user in the second touch screen sub-region.

If the abortion instruction is not detected, the second touch screen sub-region is controlled to be kept in the active state to detect the touch operation of the user in the second touch screen sub-region.

Responsive to detecting the touch operation acting on the second touch screen sub-region, a third touch screen sub-region to be activated is determined according to a similar manner until it is detected that the user stops input. The driver layer performs validity judgment according to a gesture trail of the touch operation input by the user. Responsive to determining that input is valid, the driver layer reports a screen-off gesture event to an application layer. The application layer, when receiving the screen-off gesture event, reads gesture data from a preset node of the driver layer and executes an operation corresponding to the gesture data.

Figure 5:
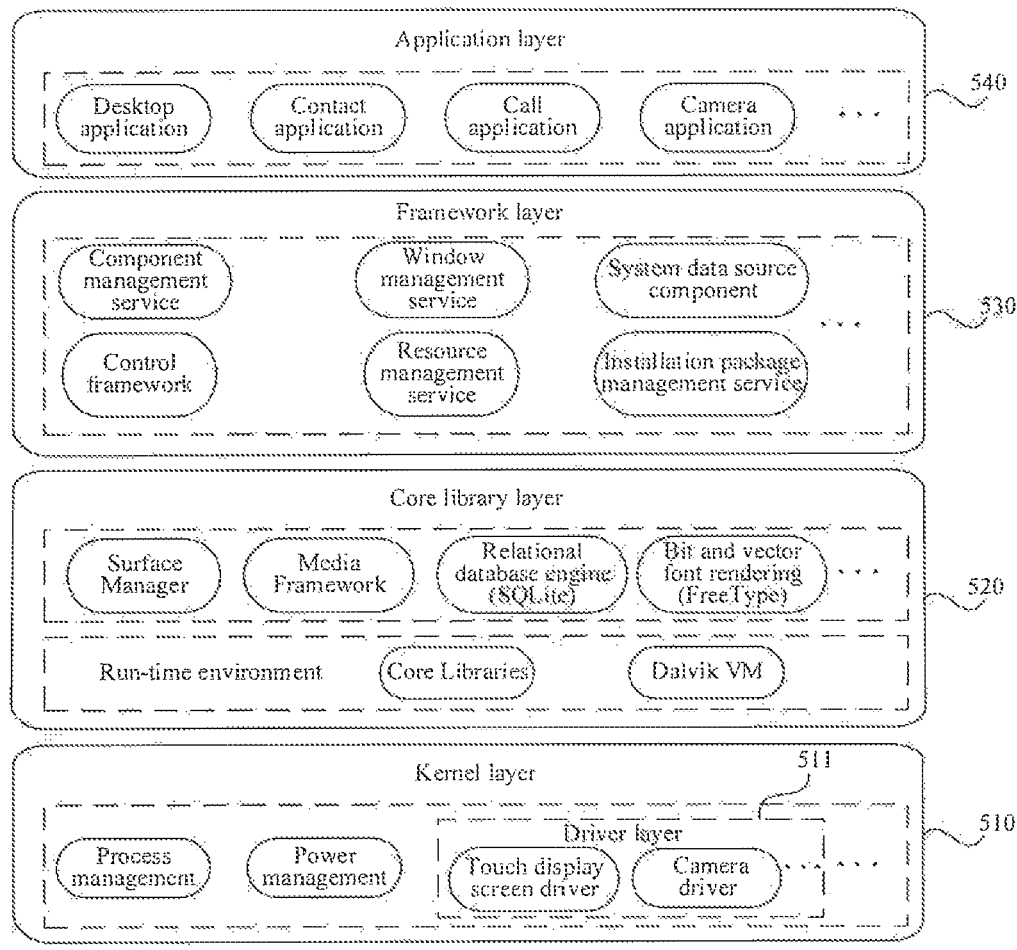
FIG. 5 is a framework diagram of an Android system according to an embodiment.

FIG. 5 is a schematic diagram of an Android system framework according to an embodiment. A screen-off gesture function execution flow provided in the embodiment will be introduced with a mobile terminal of which an operating system is an Android system illustrated in FIG. 5 as an example. As illustrated in FIG. 5, the Android system framework includes a kernel layer 510, a core library layer 520, a framework layer 530 and an application layer 540 from bottom to top. The kernel layer 510 provides core system service, including security, memory management, process management, a network protocol stack, a hardware driver and the like. The hardware driver in the kernel layer 510 is represented as a driver layer 511, and the driver layer 511 includes a touch screen driver, a camera driver and the like. The core library layer 520 includes Android Runtime and Libraries. The Android Runtime provides most of available functions in Java programming language core libraries, including core libraries and a Dalvik Virtual Machine (VM). Each Android application is an example in the Dalvik VM and runs in its own process. The libraries are used by each component of the Android system, and include the following functions: a media framework, a surface manager, SQLite (relational database engine), FreeType (bitmap and vector font rendering) and the like, and each function is exposed to a developer for use through the framework layer 530 of the Android system. The framework layer 530 provides a series of libraries required by development of Android applications such that the developer may rapidly develop applications and conveniently reuse components and may also implement personalized extension by integration, and provided service includes component management service, window management service, a system data source component, a spatial framework, resource management service, installation package management service and the like. The application layer 540 includes multiple types of applications directly interacting with the user, or service programs completed with the Java language and running in background, including programs such as a desktop application, a contact application, a call application, a camera application, a picture browser, a game, a map and a web browser, and other applications developed by developers.

For example, after a screen-off gesture function is switched-on, the touch chip, responsive to detecting a screen-off gesture, generates a wakeup signal and sends the wakeup signal to the kernel layer. The kernel layer is triggered by the wakeup signal to execute a system wakeup operation. After the system is woken up, the kernel layer calls the interruption processing function in the driver layer for execution. The driver layer reads gesture data in the touch chip through the interruption processing function and stores the read gesture data in the preset node of the driver layer. The touch chip is configured to output a touch sensing control signal to the touch screen to detect a touch operation, recognize gesture coordinates of the screen-off gesture acting on the touch screen and store gesture coordinates in its own register as the gesture data. The preset node may be a document node and, for example, may be a virtual document node under a proc-D directory. After data reading is completed, the driver layer determines validity of the gesture data. Multiple validity determination manners may be adopted. For example, the driver layer determines a gesture type according to the gesture coordinates in the gesture data and stores the determined gesture type in the preset node as the gesture data. If the gesture type is not a preset screen-off gesture, it is determined that the gesture data is invalid. For another example, the driver layer statistically obtains the amount of the gesture data, determines whether the amount meets a drawing requirement of the preset screen-off gesture or not and, if NO, determines that the gesture data is invalid. When the data is valid, the driver layer reports a screen-off gesture event. The screen-off gesture event is transmitted to the framework layer through the core library layer, and is distributed to the application layer through the framework layer. The application layer, when acquiring the screen-off gesture event, reads the gesture data from the preset node of the driver layer. After preparation of the gesture data is completed, a screen-off gesture trail is calculated according to the gesture coordinates in the gesture data, and the screen-off gesture trail is drawn on the touch screen for displaying. The application layer opens an application corresponding to the gesture type based on the gesture type in the read gesture data. The gesture type may be a gesture preset in the mobile terminal and configured to realize a function, and may also be a user-defined gesture. For example, the gesture type may be O and represents turning on the camera. For example, the gesture type may be V and represents turning on the flashlight.

For example, the screen-off gesture event may also be reported when the system is woken up. The kernel layer calls the interruption processing function of the driver layer for execution. The driver layer reads the gesture data in the touch chip through the interruption processing function and stores the gesture data in the preset node of the driver layer. When the screen-off gesture event is reported, the operations that the driver layer reads the gesture data and the gesture type is determined according to the gesture data are concurrently executed. For example, the driver layer acquires the gesture data in the preset node, performs curve fitting on the gesture data to obtain the gesture type closest to the screen-off gesture and stores the gesture type in the preset node as the gesture data. When the application layer receives the screen-off gesture event, whether preparation of the gesture data in the preset node is completed or not is detected according to a set period. When preparation is completed, the application layer reads the gesture data from the preset node. When the gesture data is successfully read and valid, the screen-off gesture trail is calculated according to the gesture coordinates and gesture type in the gesture data, and the screen-off gesture trail is drawn on the touch screen for displaying. The application layer opens the application corresponding to the gesture type based on the gesture type in the read gesture data.

At block 422, when the second touch screen sub-region is in the active state, the first touch screen sub-region is controlled to exit from the active state.

The driver layer, responsive to detecting that the second touch screen sub-region is in the active state, controls the first touch screen sub-region to exit from the active state to further reduce power consumption of the mobile terminal.

At block 424, the second touch screen sub-region is controlled to exit from the active state.

Responsive to detecting the abortion instruction input by the user for the input touch operation, the second touch screen sub-region is controlled to exit from the active state.

At block 426, responsive to that no new touch point is detected within a set time period, a mobile terminal is controlled to execute at least one of the following: vibrating for a preset number of times, or playing a set prompt tone to prompt the user to re-input the touch operation.

The set time period is set as a default by the system and is configured to represent maximum tolerance time of the driver layer when the number of the touch points in the first touch screen sub-region is relatively small. If the number of the touch points in the first touch screen sub-region is less than the preset threshold, the driver layer considers that the read touch points are not enough to draw the recognizable gesture sub-trail and detects whether there is a new touch point input within the set time period or not. If NO, the mobile terminal is controlled to execute at least one of the following operations: vibrating for the preset number of times, or producing the set prompt tone to prompt the user to re-input the touch operation. Then, if there is no new touch point input within the set time period, information of the read touch points is cleared. If there is a new touch point input within the set time period, the driver layer continues acquiring the new touch point.

According to the method of the embodiment, responsive to detecting the touch operation in the first touch screen sub-region, the number of the touch points corresponding to the touch operation is acquired, and when the number exceeds the preset threshold, the operation of determining the sliding trail of the touch points in the first touch screen sub-region is executed, so that occurrence of the circumstance that the sliding trend of the touch points may not be predicted due to the number of the touch points is relatively small is avoided. In addition, responsive to detecting the abortion instruction input by the user for the input touch operation, the second touch screen sub-region is controlled to exit from the active state, and responsive to detecting no abortion instruction, the second touch screen sub-region is controlled to be in the active state and, after the second touch screen sub-region is in the active state, the first touch screen sub-region is controlled to exit from the active state, so that the power consumption of the mobile terminal is further reduced.

Figure 6A:
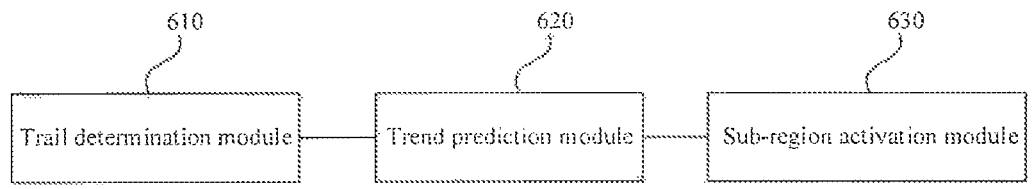
FIG. 6a is a structure block diagram of a device for detecting a screen-off gesture according to an embodiment.

FIG. 6a is a structure block diagram of a screen-off gesture detection device according to an embodiment. The device may be implemented by at least one of software or hardware and is usually integrated in a mobile terminal. As illustrated in FIG. 6a, the device may include a trail determination module 610, a trend prediction module 620 and a sub-region activation module 630.

The trail determination module 610 is configured to, responsive to detecting a touch operation of a user in a first preset touch screen sub-region in a screen-off state, determine a sliding trail of touch points corresponding to the touch operation in the first touch screen sub-region, the first touch screen sub-region being in an active state in which the touch operation can be detected. The trend prediction module 620 is configured to, in a case that a touch point among the touch points reaches a boundary of the first touch screen sub-region, predict a sliding trend of the touch points according to the sliding trail and a preset gesture template. The sub-region activation module 630 is configured to determine a second touch screen sub-region that the touch point is about to reach according to the sliding trend and control the second touch screen sub-region to be in the active state to detect a touch operation acting on the second touch screen sub-region.

According to the screen-off gesture detection device provided in the embodiment, a driving signal may be adaptively provided for the preset touch screen sub-region according to the operation of the user to avoid occurrence of the circumstance that, after a screen-off gesture function is switched-on, a touch sensing control signal is provided for a whole touch screen to cause relatively high power consumption of the mobile terminal. Through the detection device provided in the embodiment, power consumption of the mobile terminal may be effectively reduced, and endurance may be improved.

Figure 6B:
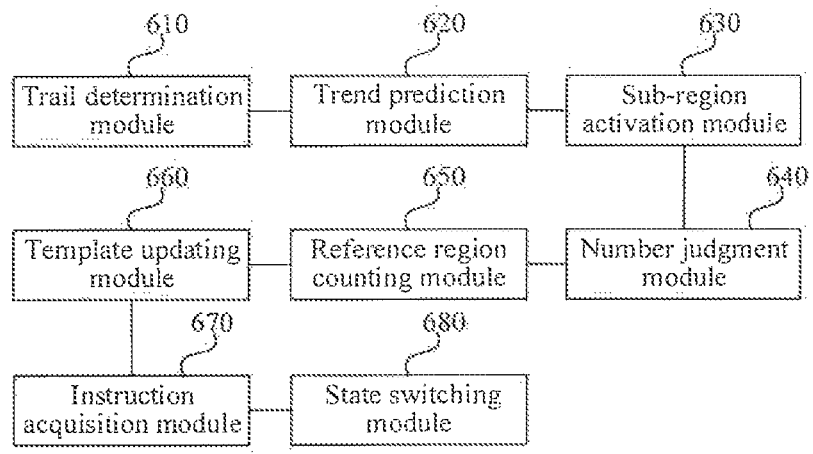
FIG. 6b is a structure block diagram of another device for detecting a screen-off gesture according to an embodiment.

FIG. 6b is a structure block diagram of another screen-off gesture detection device according to an embodiment. As illustrated in FIG. 6b, the screen-off gesture detection device further includes a number judgment module 640.

The number judgment module 640 is configured to, before the sliding trail of the touch points corresponding to the touch operation in the first touch screen sub-region is determined, acquire a number of the touch points corresponding to the touch operation in the first touch screen sub-region, judge whether the number of the touch points is less than a preset threshold or not, if YES, responsive to that no new touch point is detected within a preset time period, control the mobile terminal to execute at least one of the following operations: vibrating for a preset number of times, or playing a set prompt tone to prompt the user to re-input the touch operation, and if NO, execute the operation of determining the sliding trail of the touch points corresponding to the touch operation in the first touch screen sub-region.

In an embodiment, the trail determination module 610 is configured to determine the sliding trail of the touch points by performing a curve fitting on coordinate information of the touch points in the first touch screen sub-region.

In an embodiment, the sub-region activation module 630 is configured to determine a boundary among boundaries of the first touch screen sub-region, at a minimum distance far away from a last touch point of the sliding trail as a target boundary, and determine a touch screen sub-region collinear with the target boundary as a reference sub-region.

In an embodiment, the device further includes a reference region counting module 650, configured to, after the touch screen sub-region collinear with the target boundary is determined as the reference sub-region, count the number of reference sub-regions.

The sub-region activation module 630 is further configured to, when the number of the reference sub-regions is one, judge whether the touch point is about to pass the reference sub-region or not according to the sliding trend, if YES, determine the reference sub-region is the second touch screen sub-region and, if NO, continue acquiring the touch operation in the first touch screen sub-region.

In an embodiment, the sub-region activation module 630 is further configured to, when the number of the reference sub-region is two, determine a reference sub-region of the two sub-regions, that the touch point is about to pass according to the sliding trend as the second touch screen sub-region and, if the reference sub-region that the touch point is about to pass may not be selected according to the sliding trend, determine the two reference sub-regions as such second touch screen sub-regions.

In an embodiment, the device further includes a template updating module 660, configured to: when an updating condition of the preset gesture template is satisfied, determine a gesture trail of a screen-off gesture acquired within the set time period as a sample;

divide a gesture trail of each of a template screen-off gesture and a sample screen-off gesture which correspond to the same gesture type into at least two gesture sub-trails by adopting at least one characteristic point;

compare gesture sub-trails adopting a same characteristic point as endpoints to determine a deviation between the gesture sub-trails, and count a number of gesture sub-trails of which deviations exceed a preset deviation threshold; and when the number exceeds a preset threshold, replace the template screen-off gesture with the sample screen-off gesture.

In an embodiment, the device further includes an instruction acquisition module 670, configured to, after the second touch screen sub-region is controlled to be in the active state, judge whether an abortion instruction input by the user for the input touch operation is detected or not, if YES, control the second touch screen sub-region to exit from the active state and, if NO, controlling the second touch screen sub-region to be kept in the active state to detect the touch operation of the user in the second touch screen sub-region.

In an embodiment, the device further includes a state switching module 680, configured to, when the second touch screen sub-region is in the active state, control the first touch screen sub-region from exit from the active state.

An embodiment also provides a storage medium having stored therein computer-executable instructions that, when executed by a processor of a computer, causes the processor to execute a screen-off gesture detection method. The method includes the following operations.

Responsive to detecting a touch operation of a user in a first preset touch screen sub-region in a screen-off state, a sliding trail of touch points corresponding to the touch operation in the first touch screen sub-region is determined, the first touch screen sub-region being in an active state in which the touch operation is detectable.

In a case that a touch point among the touch points reaches a boundary of the first touch screen sub-region, a sliding trend of the touch points is predicted according to the sliding trail and a preset gesture template.

A second touch screen sub-region that the touch point is about to reach is determined according to the sliding trend, and the second touch screen sub-region is controlled to be in the active state to detect a touch operation acting on the second touch screen sub-region.

The storage medium includes multiple types of memory devices or storage devices. Term "storage medium" is intended to include: an installation medium, for example, a compact disk read-only memory (CD-ROM), a floppy disk or a magnetic tape device; a computer system memory or a random access memory (RAM), for example, a dynamic RAM (DRAM), a double data rate (DDR) RAM, a static RAM (SRAM), an extended data output (EDO) RAM (EDO RAM) and a rambus RAM; a nonvolatile memory, for example, a flash memory and a magnetic medium (for example, a hard disk or an optical memory); and a register, a memory element of another similar type or the like. The storage medium may also include memories of other types or combinations thereof. In addition, the storage medium may be located in a first computer system where a program is executed or may be located in a different second computer system and the second computer system is connected to the first computer system through a network (for example, the Internet). The second computer system may provide a program instruction for a first computer to execute. Term "storage medium" may include two or more storage media capable of residing at different positions (for example, in different computer systems connected through the network). The storage medium may store a program instruction (for example, specifically implemented as a computer program) executable for one or more processors.

According to the storage medium including the computer-executable instructions in the embodiment, the computer-executable instructions are not limited to the abovementioned screen-off gesture detection operation and may also execute related operations in the screen-off gesture detection method provided in any embodiment of the disclosure.

Figure 7:
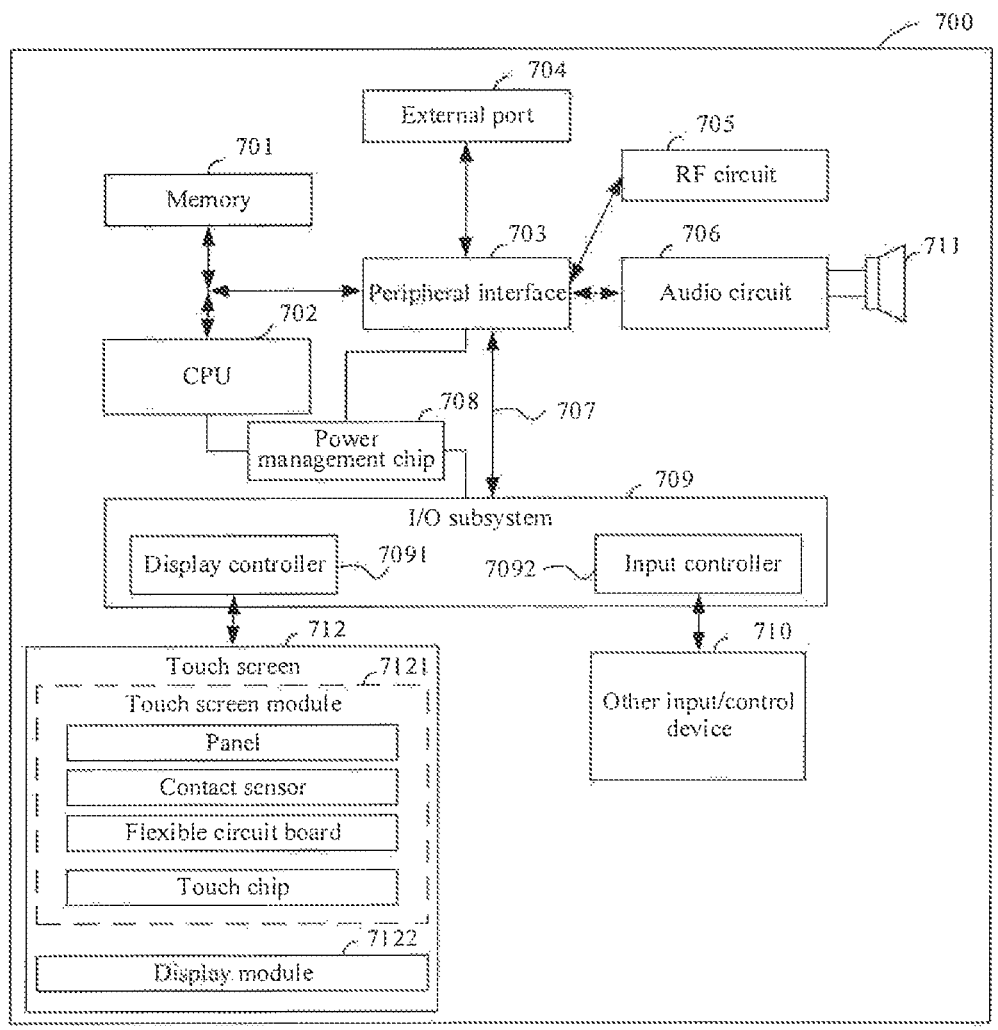
FIG. 7 is a structure diagram of a mobile terminal according to an embodiment.

An embodiment also provides a mobile terminal. The mobile terminal may be integrated with the screen-off gesture detection method provided in the embodiment. FIG. 7 is a structure diagram of a mobile terminal according to an embodiment. As illustrated in FIG. 7, the terminal may include a shell (not illustrated in the figure), a memory 701, a central processing unit (CPU) 702 (also called a processor), a circuit board (not illustrated in the figure), a touch screen 712 and a power circuit (not illustrated in the figure). The touch screen 712 includes at least two preset touch screen sub-regions, and part of the touch screen sub-regions are controlled by the processor to be in an active state to detect touch operations or display gesture trails of the touch operations. The circuit board is arranged in a space enclosed by the touch screen 712 and the shell. The CPU 702 and the memory 701 are arranged on the circuit board. The power circuit is configured to supply power to each circuit or device of the mobile terminal. The memory 701 is configured to store an association relationship between a touch operation and an application program and store a computer program capable of running in the processor. The CPU 702 reads and executes the computer program stored in the memory 701. The CPU 702 executes the computer program to implement the following operations.

Responsive to detecting a touch operation of a user in a first preset touch screen sub-region in a screen-off state, a sliding trail of touch points corresponding to the touch operation in the first touch screen sub-region is determined, the first touch screen sub-region being in the active state in which the touch operation is detectable.

In a case that a touch point among the touch points reaches a boundary of the first touch screen sub-region, a sliding trend of the touch points is predicted according to the sliding trail and a preset gesture template.

A second touch screen sub-region that the touch point is about to reach is determined according to the sliding trend, and the second touch screen sub-region is controlled to be in the active state to detect a touch operation acting on the second touch screen sub-region.

The mobile terminal further includes a peripheral interface 703, a radio frequency (RF) circuit 705, an audio circuit 706, a speaker 711, a power management chip 708, an input/output (I/O) subsystem 709, another input/control device 710 and an external port 704. These components communicate through one or more communication buses or signal lines 707.

The mobile terminal 700 illustrated in the figure is only an example of the mobile terminal, the mobile terminal 700 may further be provided with components more or fewer than those presented in the figure, and two or more components may be combined or different component configurations may be adopted. Multiple components illustrated in the figure may be implemented in hardware including one or more signal processing and/or application specific integrated circuits, software or a combination of the hardware and the software.

The mobile terminal integrated with the screen-off gesture detection device in the embodiment will be described below. The mobile terminal is, for example, a mobile phone.

The memory 701: the memory 701 may be accessed by the CPU 702, the peripheral interface 703 and the like. The memory 701 may include a high-speed RAM and may further include a nonvolatile memory, for example, at least one disk storage device, flash memory device or other volatile solid-state storage device.

The peripheral interface 703: the peripheral interface 703 may connect an I/O peripheral of a device to the CPU 702 and the memory 701.

The I/O subsystem 709: the I/O subsystem 709 may connect the I/O peripheral, such as the touch screen 712 and the other input/control device 710 on the device to the peripheral interface 703. The I/O subsystem 709 may include a display controller 7091 and one or more input controllers 7092 configured to control the other input/control device 710. The one or more input controllers 7092 receives an electrical signal from the other input/control device 710 or send an electrical signal to the other input/control device 710. The other input/control device 710 may include a physical button (a pressing button, a rocker button and the like), a dial, a slide switch, an operating rod and a click wheel. The input controller 7092 may be connected with any one of a keyboard, an infrared port, a universal serial bus (USB) interface and an indication device such as a mouse.

The touch screen 712: the touch screen 712 is an input interface and output interface between the user terminal and the user. For example, the touch screen includes a display module 7122 and a touch screen module 7121. The touch screen module 7121 includes a panel, a contact sensor, a flexible circuit board and a touch chip. The panel is a surface layer of the touch screen module, and a touch operation of the user acts on the panel. The contact sensor is fabricated according to a structure of the touch screen module and a design requirement of the touch chip. The contact sensor is electrically connected with the touch chip through the flexible circuit board. The touch screen module 7121 may detect the touch operation. The display module 7122 may display visual output to the user, the visual output including a graph, a text, an icon and a video, etc.

The display controller 7091 in the I/O subsystem 709 receives the electrical signal from the touch screen 712 or send the electrical signal to the touch screen 712. The touch screen 712 detects a touch on the touch screen. The display controller 7091 converts the detected touch into interaction with a user interface object displayed on the touch screen 712 to implement human-computer interaction. The user interface object displayed on the touch screen 712 may be an icon of a running game, an icon connected to a corresponding network and the like. The device may further include an optical mouse. The optical mouse is a touch sensitive surface which does not display the visual output or an extension of the touch sensitive surface formed by the touch screen module.

The RF circuit 705 is configured to establish communication with a wireless network (i.e., a network side) to implement data reception and sending, for example, reception and sending of short messages and electronic mails, between the phone and the wireless network. The RF circuit 705 receives and sends an RF signal. The RF signal may also be called an electromagnetic signal. The RF circuit 705 converts the electrical signal into the electromagnetic signal or converts the electromagnetic signal into the electrical signal and communicates with the communication network and another device through the electromagnetic signal. The RF circuit 705 may include a known circuit configured to realize these functions and includes. The RF circuit 705 includes, but not limited to, an antenna system, an RF transceiver, one or more amplifiers, a tuner, one or more oscillators, a digital signal processor, a coder-DECoder (CODEC) chip set, a subscriber identity module (SIM) and the like.

The audio circuit 706 is configured to receive audio data from the peripheral interface 703, convert the audio data into an electrical signal and send the electrical signal to the speaker 711.

The speaker 711 is configured to recover a voice signal received from the wireless network by the phone through the RF circuit 705 into a sound and play the sound to the user.

The power management chip 708 is configured to perform power supply and power management on hardware connected with the CPU 702, the I/O subsystem and the peripheral interface.

Through the mobile terminal provided in the embodiment, power consumption of the mobile terminal may be effectively reduced, and endurance may be improved.

The screen-off gesture detection device, storage medium and mobile terminal provided in the embodiments may execute the screen-off gesture detection method provided in any embodiment and have corresponding function modules executing the method and corresponding beneficial effects. Technical details not elaborated in the above embodiments may refer to the screen-off gesture detection method provided in any abovementioned embodiment.

The invention claimed is:

1. A method for detecting a screen-off gesture, comprising:
    responsive to detecting a touch operation of a user in a first preset touch screen sub-region in a screen-off state, determining a sliding trail of touch points corresponding to the touch operation in the first touch screen sub-region, wherein the first touch screen sub-region is in an active state in which the touch operation is detectable;
    in response to detecting that a touch point among the touch points reaches a boundary of the first touch screen sub-region, predicting a sliding trend of the touch points according to the sliding trail and a preset gesture template; and
    determining a second touch screen sub-region that the touch operation is about to reach according to the sliding trend and responsive to the determining, controlling the second touch screen sub-region to be in the active state to detect the touch operation acting on the second touch screen sub-region.

2. The method of claim 1, further comprising:
    before determining the sliding trail of the touch points corresponding to the touch operation in the first touch screen sub-region,
    acquiring a number of the touch points corresponding to the touch operation in the first touch screen sub-region;
    judging whether the number of the touch points is less than a preset threshold;
    in response to judging that the number of the touch points is less than the preset threshold, responsive to determining that no new touch point is detected within a preset time period, controlling a mobile terminal to perform at least one of the following: vibrating for a preset number of times, or playing a set prompt tone to prompt a user to re-input a touch operation; and
    in response to judging that the number of the touch points is greater than or equal to the preset threshold, determining the sliding trail of the touch points corresponding to the touch operation in the first touch screen sub-region.

3. The method of claim 2, wherein determining the sliding trail of the touch points corresponding to the touch operation in the first touch screen sub-region comprises:

determining the sliding trail of the touch points by performing a curve fitting on coordinate information of the touch points in the first touch screen sub-region.

4. The method of claim 1, wherein determining the second touch screen sub-region that the touch operation is about to reach according to the sliding trend comprises:
   determining a boundary among boundaries of the first touch screen sub-region, at a shortest distance from a last touch point of the sliding trail as a target boundary, and determining a touch screen sub-region collinear with the target boundary as a reference sub-region;
   in response to determining that a number of reference sub-regions is one, judging whether the touch operation is about to pass the reference sub-region according to the sliding trend;
   in response to judging that the touch operation is about to pass the reference sub-region, determining the reference sub-region as the second touch screen sub-region; and
   in response to judging that the touch operation is not about to pass the reference sub-region, continuing acquiring the touch operation in the first touch screen sub-region.

5. The method of claim 4, further comprising:
   after determining the touch screen sub-region collinear with the target boundary as the reference sub region,
   counting the number of the reference sub-regions,
   in response to determining that the number of the reference sub-regions is two, determining one reference sub-region that the touch operation is about to pass, of the two reference sub-regions as the second touch screen sub-region according to the sliding trend, otherwise determining both the two reference sub-regions as second touch screen sub-regions.

6. The method of claim 1, further comprising:
   in response to determining that an updating condition of the preset gesture template is satisfied, determining a gesture trail of a screen-off gesture acquired within a set time period as a sample;
   dividing a gesture trail of each of a template screen-off gesture and a sample screen-off gesture which correspond to a same gesture type into at least two gesture sub-trails by adopting at least one set characteristic point;
   comparing gesture sub-trails adopting a same characteristic point as endpoints to determine a deviation between the gesture sub-trails, and counting a number of deviations each of which exceeds a preset deviation threshold; and
   in response to determining that the number exceeds a preset threshold, replacing the template screen-off gesture with the sample screen-off gesture.

7. The method of claim 1, further comprising:
   after controlling the second touch screen sub-region to be in the active state,
   judging whether an abortion instruction, input by the user, for the touch operation is detected;
   in response to determining that the abortion instruction for the touch operation is detected, controlling the second touch screen sub-region to exit from the active state;
   in response to determining that the abortion instruction for the touch operation is not detected, controlling the second touch screen sub-region to be kept in the active state to detect the touch operation input by the user in the second touch screen sub-region.

8. The method of claim 1, further comprising:
   in response to determining that the second touch screen sub-region is in the active state, controlling the first touch screen sub-region to exit from the active state.

9. A non-transitory computer-readable storage medium having stored therein a computer program that, when executed by a processor, causes the processor to implement the method for detecting a screen-off gesture, wherein the method comprises,
   responsive to detecting a touch operation of a user in a first preset touch screen sub-region in a screen-off state, determining a sliding trail of touch points corresponding to the touch operation in the first touch screen sub-region, wherein the first touch screen sub-region is in an active state in which the touch operation is detectable;
   in response to detecting that a touch point among the touch points reaches a boundary of the first touch screen sub-region, predicting a sliding trend of the touch points according to the sliding trail and a preset gesture template; and
   determining a second touch screen sub-region that the touch operation is about to reach according to the sliding trend and responsive to the determining, controlling the second touch screen sub-region to be in the active state to detect the touch operation acting on the second touch screen sub-region.

10. The non-transitory computer-readable storage medium of claim 9, wherein the method further comprises:
    before determining the sliding trail of the touch points corresponding to the touch operation in the first touch screen sub-region,
    acquiring a number of the touch points corresponding to the touch operation in the first touch screen sub-region;
    judging whether the number of the touch points is less than a preset threshold;
    if the number of the touch points is less than the preset threshold, responsive to determining that no new touch point is detected within a preset time period, controlling a mobile terminal to perform at least one of the following: vibrating for a preset number of times, or playing a set prompt tone to prompt a user to re-input a touch operation; and
    if the number of the touch points is greater than or equal to the preset threshold, determining the sliding trail of the touch points corresponding to the touch operation in the first touch screen sub-region.

11. The non-transitory computer-readable storage medium of claim 10, wherein determining the sliding trail of the touch points corresponding to the touch operation in the first touch screen sub-region comprises:
    determining the sliding trail of the touch points by performing a curve fitting on coordinate information of the touch points in the first touch screen sub-region.

12. The non-transitory computer-readable storage medium of claim 9, wherein determining the second touch screen sub-region that the touch operation is about to reach according to the sliding trend comprises:
    determining a boundary among boundaries of the first touch screen sub-region, at a shortest distance from a last touch point of the sliding trail as a target boundary, and determining a touch screen sub-region collinear with the target boundary as a reference sub-region;
    when a number of reference sub-regions is one, judging whether the touch operation is about to pass the reference sub-region according to the sliding trend;

if the touch operation is judged to be about to pass the reference sub-region, determining the reference sub-region as the second touch screen sub-region; and otherwise, continuing acquiring the touch operation in the first touch screen sub-region.

13. A mobile terminal, comprising:

a touch screen, comprising at least two preset touch screen sub-regions, part of the touch screen sub-regions being controlled by a processor to be in an active state to detect a touch operation or display a gesture trail of the touch operation;

a memory, configured to store an association relationship between a touch operation and an application and store a computer program capable of running in the processor; and the processor, configured to execute the computer program to:

responsive to detecting a touch operation of a user in a first preset touch screen sub-region in a screen-off state, determining a sliding trail of touch points corresponding to the touch operation in the first touch screen sub-region, wherein the first touch screen sub-region is in an active state in which the touch operation is detectable;

in response to detecting that a touch point among the touch points reaches a boundary of the first touch screen sub-region, predicting a sliding trend of the touch points according to the sliding trail and a preset gesture template; and determine a second touch screen sub-region that the touch operation is about to reach according to the sliding trend and responsive to the determining, control the second touch screen sub-region to be in the active state to detect the touch operation acting on the second touch screen sub-region.

14. The mobile terminal of claim 13, wherein the processor is further configured to:

before determining the sliding trail of the touch points corresponding to the touch operation in the first touch screen sub-region, acquire a number of the touch points corresponding to the touch operation in the first touch screen sub-region;

judge whether the number of the touch points is less than a preset threshold;

if the number of the touch points is less than the preset threshold, responsive to determining that no new touch point is detected within a preset time period, control a mobile terminal to perform at least one of the following: vibrating for a preset number of times, or playing a set prompt tone to prompt a user to re-input a touch operation; and if the number of the touch points is greater than or equal to the preset threshold, determine the sliding trail of the touch points corresponding to the touch operation in the first touch screen sub-region.

15. The mobile terminal of claim 14, wherein the processor is further configured to:

determine the sliding trail of the touch points by performing a curve fitting on coordinate information of the touch points in the first touch screen sub-region.

16. The mobile terminal of claim 13, wherein the processor is further configured to:

determine a boundary among boundaries of the first touch screen sub-region, at a shortest distance from a last touch point of the sliding trail as a target boundary, and determine a touch screen sub-region collinear with the target boundary as a reference sub-region;

when a number of reference sub-regions is one, judge whether the touch operation is about to pass the reference sub-region according to the sliding trend;

if the touch operation is judged to be about to pass the reference sub-region, determine the reference sub-region as the second touch screen sub-region; and otherwise, continue acquiring the touch operation in the first touch screen sub-region.

17. The mobile terminal of claim 16, wherein the processor is further configured to:

after determining the touch screen sub-region collinear with the target boundary as the reference sub-region, count the number of the reference sub-regions, when the number of the reference sub-regions is two, determine one reference sub-region that the touch operation is about to pass, of the two reference sub-regions as the second touch screen sub-region according to the sliding trend, otherwise determine both the two reference sub-regions as second touch screen sub-regions.

18. The mobile terminal of claim 13, wherein the processor is further configured to:

when an updating condition of the preset gesture template is satisfied, determine a gesture trail of a screen-off gesture acquired within a set time period as a sample;

divide a gesture trail of each of a template screen-off gesture and a sample screen-off gesture which correspond to a same gesture type into at least two gesture sub-trails by adopting at least one set characteristic point;

compare gesture sub-trails adopting a same characteristic point as endpoints to determine a deviation between the gesture sub-trails, and count a number of deviations each of which exceeds a preset deviation threshold; and when the number exceeds a preset threshold, replace the template screen-off gesture with the sample screen-off gesture.

19. The mobile terminal of claim 13, wherein the processor is further configured to:

after controlling the second touch screen sub-region to be in the active state, judge whether an abortion instruction, input by the user, for the touch operation is detected;

if the abortion instruction for the touch operation is detected, control the second touch screen sub-region to exit from the active state;

otherwise, control the second touch screen sub-region to be kept in the active state to detect the touch operation input by the user in the second touch screen sub-region.

20. The mobile terminal of claim 13, wherein the processor is further configured to:

when the second touch screen sub-region is in the active state, control the first touch screen sub-region to exit from the active state.

* * * * *